April 10, 1934.  A. H. DALL ET AL  1,954,442
GRINDING MACHINE
Filed Aug. 17, 1932  5 Sheets-Sheet 2

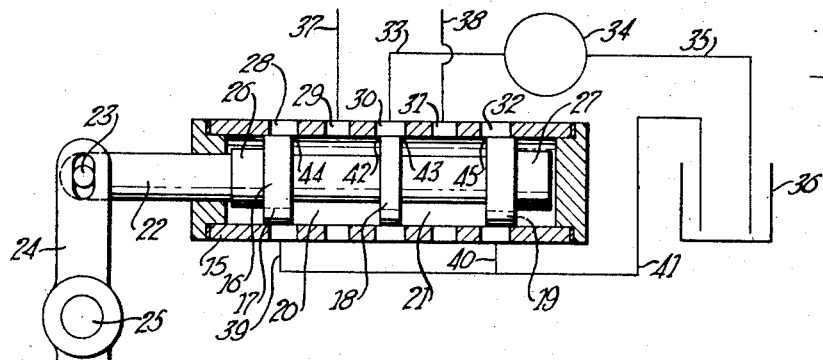

Inventor
ALBERT H. DALL
HANS ERNST
By A. H. Parsons
Attorney

April 10, 1934.  A. H. DALL ET AL  1,954,442
GRINDING MACHINE
Filed Aug. 17, 1932  5 Sheets-Sheet 3

Inventor
ALBERT H. DALL
HANS ERNST
By A. H. Parsons
Attorney

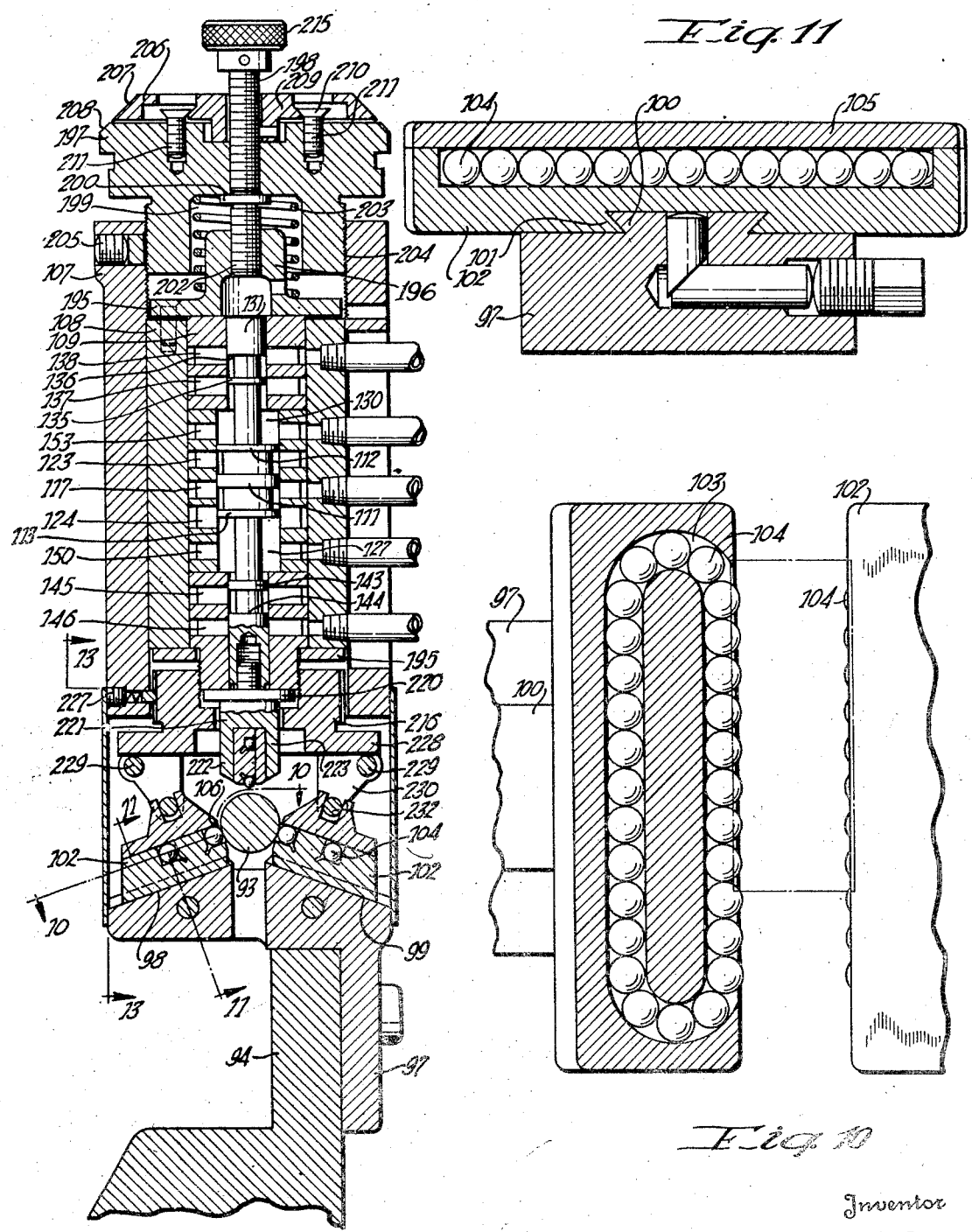

April 10, 1934.  A. H. DALL ET AL  1,954,442
GRINDING MACHINE
Filed Aug. 17, 1932   5 Sheets-Sheet 5
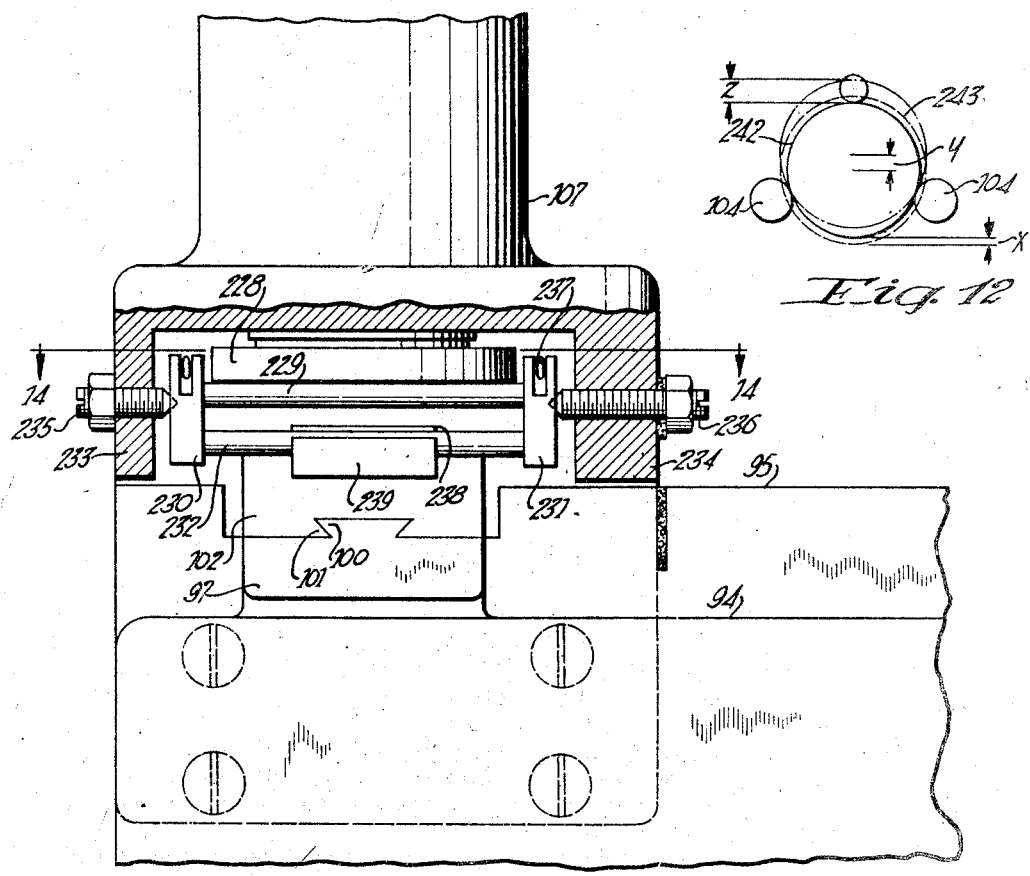
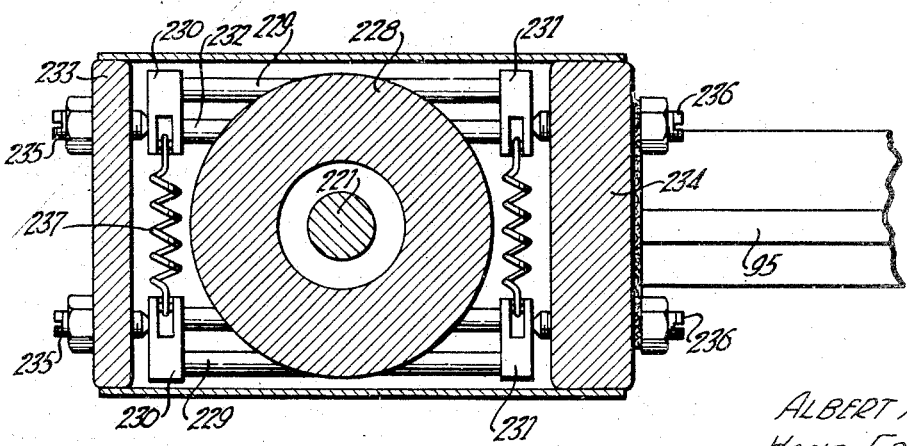
Inventor
ALBERT H. DALL
HANS ERNST
By AHKParsons
Attorney Patented Apr. 10, 1934

1,954,442

UNITED STATES PATENT OFFICE 1,954,442

GRINDING MACHINE

Albert H. Dall and Hans Ernst, Cincinnati, Ohio, assignors to Cincinnati Grinders Incorporated, Cincinnati, Ohio, a corporation of Ohio Application August 17, 1932, Serial No. 629,185

31 Claims. (Cl. 51—103)

This invention relates to improvements in sensitive hydraulic valves and their use or application.

One of the principal objects of the present invention is the provision of an improved valve structure for dividing, controlling and maintaining a division of pressure in control or operating lines or conduits extending from the valve.

Another object of the invention is the provision of such a valve in which the variation or change of the pressure in said control conduits or channels is directly proportioned to the movement of the valve, or in other words in which the change of pressure in the said conduits or channels is a straight line change in accordance with the movement of the valve.

A further object of the invention is the provision of such a valve in which the change of pressure in the said lines may react on the valve for effecting the continued movement thereof or utilizing the change in pressure for completing the movement of the valve and thereby automatically changing the function of the valve.

It is a further object of the present invention to provide a highly sensitive valve in which a minute movement of the valve will effect maximum variation in the utilized pressure which is employed for sizing, gauging, machine tool control and numerous other purposes.

A still further object of the invention is the provision of an improved sizing control mechanism operable by the valve for insuring the continuous production from machine tools of work pieces within narrow limits of tolerance.

It is a further object of the invention to provide a sizing mechanism utilizing a valve control mechanism in which minute changes in the size of the work will effect a large movement of the valve and thereby control large forces for moving or adjusting parts of the machine to maintain an accurate adjustment thereof.

It is also an object of this invention to provide an improved work support for use with sizing devices or the like which will amplify any variation in the dimension of work pieces supported thereon without the use of amplifying levers or members of that nature.

Other objects and advantages of the present invention should be readily apparent by reference to the following specification considered in conjunction with the accompanying drawings, forming a part thereof, and it is to be understood that any modifications may be made in the exact structural details there shown and described within the scope of the appended claims without departing from or exceeding the spirit of the invention.

In the drawings:

Figure 1 is a semi-diagrammatic illustration of a valve embodying the improvements of this invention and adapted to control, change and maintain a division of pressure in the operating lines or channels of a hydraulic circuit.

Figure 2 is a semi-diagrammatic view adapting the valve shown in Figure 1 to a sizing gauge or the like.

Figure 3 is a semi-diagrammatic view of the valve shown in Figure 1 associated with pistons or the like whereby the movement of the valve for changing the pressure in the operating lines operates the pistons and thereby continues the initial movement of the valve.

Figure 4 is a semi-diagrammatic view of the valve in a modified form and combining the valve and piston in a unitary structure.

Figure 9 is a view similar to Figure 8 showing the valve in a second position.

Figure 10 is a view partly in section and partly in elevation as seen from line 10—10 on Figure 9.

Figure 11 is a sectional view taken at right angles to Figure 10 and as seen from line 11—11 of Figure 9.

Figure 12 is a view illustrating the natural amplification of the improved work support associated with the invention.

Figure 13 is an elevational view taken on line 13—13 of Figure 9 illustrating the work supporting shoes adjusting mechanism.

Figure 14 is a sectional view taken on line 14—14 of Figure 13.

Throughout the several views of the drawings similar reference characters are employed to denote the same or similar parts.

Figure 5:
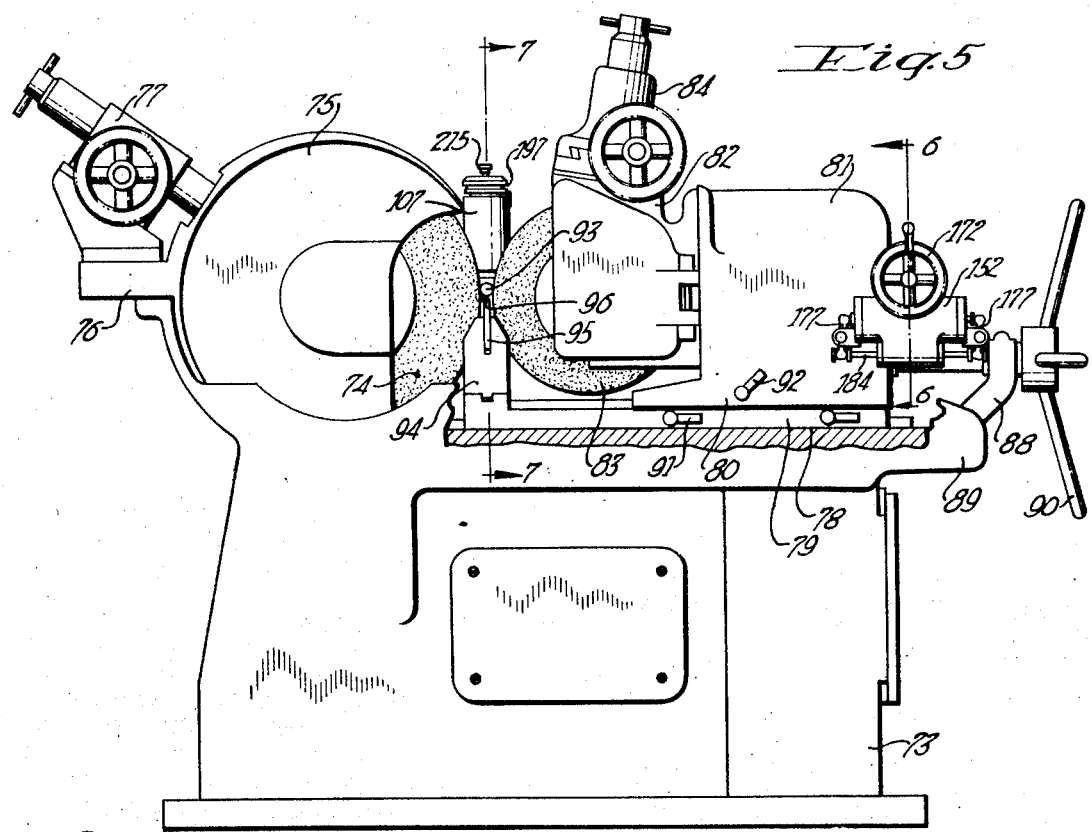
Figure 5 is an elevation of a centerless grinder having associated therewith the valve shown in Figure 4 for controlling the moving parts of the machine in order to maintain the size of the work pieces produced thereby within very narrow limits of tolerance.

As was noted above, the valve of this invention effects, controls and maintains a division of flow and pressure in an hydraulic circuit between two operating lines or channels. These lines or channels may be connected with either a reversing valve for effecting the operation of said valve through a difference in pressure in said lines, the valve may be employed for operating a piston or other type of hydraulic motor in opposite directions again because of the difference in pressures in said lines, or it may be employed for any number of practical uses. The valve may be further employed for operating a gauging mechanism for determining the size of a work piece being gauged, or it may be employed in connection with a sizing device associated with machine tools to maintain the production of work pieces from the tool within narrow limits of tolerance. It is to be understood that these large variations in pressures in the operating conduits or channels extending from the valve are effected by a small movement of the valve itself.

As shown in Figure 1, the valve comprises a sleeve or casing 15 enclosing a piston type valve 16. The valve 16 has formed thereon the collars 17, 18 and 19 forming between them the cannelures 20 and 21. A valve stem 22 extends from the valve proper beyond one end of the sleeve or casing 15 having at its end a pin and slot connection 23 with a lever 24. The lever 24 is pivoted at 25 intermediate its ends for manual operation for shifting the valve 16 relative to the sleeve 15. The collars 17 and 19 each have extending from its outer surface an enlarged portion 26 and 27 adapted to engage the plugs or closures at the ends of the sleeve 15 and thereby limit the movement of the valve.

The valve casing or sleeve 15 is provided with a plurality of sets of radial ports 28, 29, 30, 31 and 32, each set having its ports connected by a suitable groove formed circumferentially exteriorly of the sleeve, as is usual practice, so that each port of the sets 28 and 32 is simultaneously connected with the exhaust line 41, while each port of the set 30 is simultaneously conected with the pressure line 33. Connected with the ports 30 and their groove is one end of the conduit or channel 33 extending from the discharge end of a pump 34 which pump has its intake connected by means of a conduit 35 with a sump or tank 36 that contains the hydraulic medium utilized and distributed by the valve. Extending from the ports 29 and 31 are the operating conduits or channels 37 and 38 which are connected to the mechanism which is adapted to be operated by the difference in pressure therein. Connected with the ports 28 and 32 respectively is one end of branch discharge conduits 39 and 40 which are connected with the main discharge conduit 41 that terminates in the sump or tank 36.

As shown in Figure 1, the width of the central collar 18 is slightly less than the diameter of the ports 30 so that with the collar centrally of the ports an opening or orifice is provided between the shoulders formed by the opposite faces of the collar 18 and the diametrical points of ports 30 when measured in the direction of extent of the width of the collar 18. These orifices are in effect resistances which may be indicated by reference characters 42 and 43, each setting up a resistance to the flow of the fluid through the orifices. Collar 17 is so positioned as respects the ports 28 that with the collar 18 in the position illustrated as respects the ports 30 a resistance 44 is provided to the flow of the hydraulic medium into the branch discharge conduit 39. Likewise the collar 19 is so related to the ports 32 as to set up a resistance 45 to the flow to the conduit 40. With the parts in the position shown in Figure 1, resistances 42 and 43 are substantially equal, likewise resistances 44 and 45 are substantially equal, so that a substantially equal flow is had through said resistances to the sump or tank 36.

Referring now to the basic proposition of pressure, it may be stated that pressure is equal to the quantity of fluid flowing in a given time through a given orifice or resistance which may be stated as an equation as follows:

$$P=QR$$

in which P is the pressure, Q is the quantity of fluid flowing in a given time, and R is the resistance set up to this flow. Now, since the flow is equally divided through the orifices on opposite sides of the collar 18 and since the resistances 42 and 43 and 44 and 45 are substantially equal, the flow into the cannelures 20 and 21 will be substantially equal and will be substantially one-half of the flow in the line 33 extending from the pump 34. Since the resistances 44 and 45 are equal, an equal resistance will be set up to the flow from each of the cannelures or chambers 20 and 21. Therefore, with substantially equal flows into the chambers 20 and 21 and with substantially equal resistances to said flows the pressures in the chambers are equal. From this it will be seen that the pressures in the operating lines 37 and 38 are substantially equal. In order to change the pressures, it is necessary to either increase the flow of fluid without varying the resistance or with the same flow vary the resistance, or by a variation in both at the same time.

In practice the resistances 42 and 45 are made equal, while the resistances 43 and 44 are likewise made equal. From this it will be seen that the sum of the resistances on each side of the central collar 18 or the resistances in each leg of the flow of the fluid are equal so that with the parts as shown in Figure 1, the pressures in these legs will be substantially equal. It will also be noted that the collars 17, 18 and 19 are simultaneously moved thereby simultaneously varying each of the resistances while maintaining the sums of said resistances in each leg substantially equal. In other words, as the resistance 43 is increased the resistance 45 is decreased and consequently the resistance 42 is decreased while the resistance 44 increases. The sum of the resistances 43 and 45 determines the quantity of fluid flowing into the cannelure or chamber 21 and the sum of the resistances 42 and 44 determines the quantity of fluid flowing into the chamber 20 for thereby determining the rate of flow per unit of time in each leg, while the resistances 44 and 45 determine the pressure in accordance with the rate of flow. From this it will be seen that actuation of the lever 24 in a counterclockwise direction will shift the valve 16 to the right thereby increasing the resistance 43 and correspondingly decreasing the resistance 45 and slowing down the rate of flow of the medium through the chamber 21 without varying the quantity of flow. From the equation $$P=QR$$

it will follow that with the same quantity of fluid flowing into the chamber 21 times the lowered resistance 45, the pressure in line 38 will be reduced. Simultaneously the resistance 42 was decreased and the resistance 44 was increased thereby increasing the pressure in the line 37. Fom this it will be seen this division or difference in pressure will be maintained in the lines 37 and 38 so long as the valve 16 is allowed to remain in its adjusted position. It should also be noted that the slightest movement of the valve relative to the casing automatically varies the resistance to flow so that the pressures in the lines 37 and 38 will be varied for each different position or adjustment of the valve relative to the casing 15. It has been found in practice that for a limited movement this difference in pressure may be made directly proportional to the movement of the valve so that for each increment of movement of the valve a different pressure drop results in one of the lines and a corresponding increase in pressure in the other line. From this it will be seen that there has been provided a highly sensitive valve which, by a very minute movement, may effect, control and maintain a difference in pressure in two operating lines that may be utilized for any desired useful purpose.

In Figure 2 the valve illustrated in Figure 1 has been employed for operating a gauging mechanism. As shown in Figure 2, the pressure lines 37 and 38 terminate at opposite ends of a cylinder 46 which encloses a double acting piston 47. The piston 47 has a pin and slot connection at 48 with an indicating finger 49, which is pivoted for oscillation by the pivot pin 50. The finger 49 terminates in a pointer 51 adapted to co-operate with a scale 52 suitably graduated to indicate units of measurements such as fractions of a tenth of a thousandth of an inch and the like. The casing 15a of the valve in addition to enclosing the valve 16a carries a spring 53 which abuts on one end with a plug or cap 54 and on the other end with the valve 16a. The lower end of the casing 15a is closed by a suitable nut 55 having projecting into the casing a collar 56 furnishing a shoulder for engagement with the adjacent side of the valve collar 17 to limit the downward movement of the valve 16a. The valve stem 57 terminates in a gauging point for contact with the surface of a work piece 58 carried by a suitable V-block or the like 59 for movement relative to and beneath the gauge valve. In order to prevent the piston from travelling the full length of its cylinder for differences in pressure less than the range of the gauge, and to return the pointer and gauging finger 49 to the end of its scale, as when there is no work piece contacting with the valve stem, there is provided a spring 60 having one end secured to the finger 49 and the other end anchored to a stationary support or member. A stop pin 61 is likewise provided for limiting the movement of the finger 49 under influence of the spring 60.

The operation of the gauging mechanism is as follows: With a work piece removed from beneath the valve stem 57 the spring 53, which is relatively light, forces the valve 16a downwardly for engaging its collar 17 with the boss 56 of the nut 55. This position of the valve causes an increase of pressure in the chamber 21 which shifts the piston 47 to its left hand position and brings the pointer in line with the end of the scale 52. The scale 52 may be so arranged that the center thereof is the point at which a work piece is to the exact size, while the graduations to the left thereof would indicate a minus or below exact size and the graduations to the right would indicate a plus or above exact size. The work piece is now placed in the V-block and actuated relative to the valve to engage said work piece with the valve stem 57 thereby vertically shifting the valve 16a. This movement of the valve, as above described, changes the pressures on opposite sides of the central collar so that the pressure in the line 37 now increases while the pressure in the line 38 decreases, thereby actuating the piston to the right and swinging the pointer 49 in a clockwise direction. The difference in pressure in the lines 37 and 38 is made up by the spring 60 so that the pointer 51 will stop at a point indicative of the differences in hydraulic pressure in the lines 37 and 38, which through the scale 52 measures the size of the work. As illustrated in Figure 2, the work piece is to the exact size so that the pointer will come to rest when the highest point of the work is beneath the valve stem 57 at its mid or zero position. Should the work piece be under size it would take a position between the zero point and the left hand end of the scale, while an over size work piece would cause the pointer to take a position between the zero point and right hand end of the scale.

In Figure 3 the valve of Figures 1 and 2 has been associated with hydraulically actuated motors or pistons upon which the differences in pressures in the lines 37 and 38 act. As there shown, the line 37 terminates at one end of a piston cylinder 62 enclosing a piston 63. The line 38 terminates at one end of a piston cylinder 64 which encloses a piston 65. The other ends of the cylinders 62 and 64 are respectively connected by means of discharge conduits 66 and 67 which terminate in the reservoir or sump 36. Either of the pistons 63 or 65 may have a piston rod 68 formed integral therewith, and connected to a mechanism for operation thereby. As will later appear, this type of mechanism, in modified form, is utilized for sizing devices and may be employed for innumerable other uses. In such a case the valve shown in Figure 3 is adapted to have the central collar 18 of the valve 16b slightly displaced so that a somewhat higher pressure is maintained in either of the chambers 20 or 21 to hold the valve in a position where the piston rod 68, for example, is adapted to be in an operative position. It will be seen that with a higher pressure in the chamber 21, for example, the higher pressure will also be in conduit or channel 38, which acting on the piston 65 will hold the valve in the position shown. However, displacement of the valve through the piston rod 68 of the piston 63 will immediately change the pressures in the chambers 20 and 21 so that the higher pressure is now in the chamber 20 and conduit or channel 37. This higher pressure acting on the piston 63 will urge the piston 63 to the right as seen in Figure 3, which will shift the valve 16b and thereby create a still greater differential in the pressures in chambers 20 and 21. This higher pressure therefore continues to act on the piston 63 until the valve and piston 65 have been shifted to their other limit of movement which is determined by the adjustable stop 65a which engages one face of each piston.

From the foregoing it will be noted that the mechanism disclosed in Figure 3 is such that once it has been unbalanced it will continue to move until the end of its stroke is reached. In other words, the variation in pressure acting on one of the pistons will be continued to be built up as the valve is shifted and thereby continue to increase the pressure on that piston while continuing to decrease the opposite pressure on the idle piston. Any suitable or desirable means may be employed for returning the valve to its normal position, whereupon the pressure on the second piston will again be greater than that on the first to hold the parts in their normal working position.

In Figure 4 is illustrated a mechanism in which the pistons and the valve of Figure 3 are combined into a unitary structure which in practice is the most desirable for sizing mechanism and other types of devices. As shown in Figure 4, the central collar 18a is enlarged beyond the end collars 17a and 19a, which are shown as of the same diameter as the valve guides 69 and 70. In this construction the central collar 18a therefore not only acts as a flow divider and resistance variator, but also acts as a piston against which the differential pressures on each side thereof act for completing the shifting of the valve in either direction when once unbalanced. The movement of this valve is controlled by means of stops 71 and 72 adapted to engage with the piston guides 69 and 70. The valve illustrated in Figure 4 is the one that has been used in actual practice as will be later described with certain modifications.

As was noted above, the invention is illustrated in connection with a machine tool for controlling the adjustable parts thereof for maintaining the size of the work piece within extremely narrow limits of tolerance. The particular machine illustrated in the drawings is what is commercially known as a centerless grinder, which produces work pieces within fractional thousandths of an inch. In order to maintain a constant production from this machine and to take up the inevitable wear on the wheels, the sizing mechanism controls and energizes a feeding mechanism for incrementally adjusting the parts as the work decreases in diameter. The machine comprises a suitable bed or support 73 which has rising therefrom a pedestal bearing in which is journaled a spindle for the grinding wheel 74 enclosed within a suitable hood 75 associated with the pedestal bearing. The hood 75 has projecting from it a ledge 76 supporting a truing mechanism 77 adapted to be actuated transversely of the grinding wheel face for truing the said grinding wheel.

The bed 73 is further provided with a guideway 78 for a lower slide 79 for guiding said slide during its movement relative to the bed. The lower slide 79 is provided on its upper surface with a suitable guideway for an upper slide 80 having associated therewith a bracket 81. The bracket 81 carries a head 82 in which is journaled a spindle for the regulating wheel 83 which has its peripheral surface opposed to that of the grinding wheel and forming between them a work receiving throat. Carried by the head 82 for movement relative thereto is a truing mechanism 84 movable transversely of the regulating wheel 83 for truing the active face thereof.

The wheels 74 and 83 are made of abrasive material and are respectively rotated at a high grinding rate of speed and a relatively slow work rotation controlling rate of speed. The wheels are further rotated in the same direction whereby the proximate portions of the said wheels travel in opposite directions, or with the periphery of the grinding wheel travelling downwardly, while that of the regulating wheel travels upwardly.

In order to adjust the grinding throat the slide 80 and bracket 81 have swiveled in their rear wall a sleeve nut 85 held against inadvertent axial movement relative thereto by means of nuts or collars 86. An adjusting screw 87 is in threaded engagement with the nut and has its rear end rotatably journaled in a bracket 88 secured to an extending portion 89 of the bed 73. A pilot or hand wheel 90 is secured to the screw beyond the bracket 88 whereby the screw may be manually rotated for effecting the said adjustment. The slides 79 and 80 are adapted to be independently and jointly adjusted by the screw for which purpose there is provided a clamp 91 for securing the lower slide 79 to the bed to permit independent adjustment of the upper slide 80 while upon engagement of the clamp 92 and loosening of the clamp 91, the upper and lower slides 80 and 79 are secured to one another for unitary adjustment. It is to be understood that the unitary adjustment of the slides is made primarily for setting up purposes and the like and for initially adjusting the size of the throat to the final size of the work piece and that to take up for wheel wear on both the grinding and regulating wheels within certain limits the upper slide 80 and parts carried thereby only are adjusted.

To support the work piece 93 in the grinding throat the lower slide 79 has secured to its inner end a block 94 in which is mounted a work rest blade 95 having an angle top 96 inclining in the general direction of the periphery of the regulating wheel 83. As is usual practice in through feed grinding, the regulating wheel 83 and head 82 are adapted to be angularly adjusted to dispose the axis of the said regulating wheel 83 at an angle to the work for thereby exerting a feed component or thrust on the work toward the rear of the machine. It is to be understood that this angular adjustment is relatively slight and not shown in the drawings because of the slightness of such angle.

Figures 7, 8, 15:
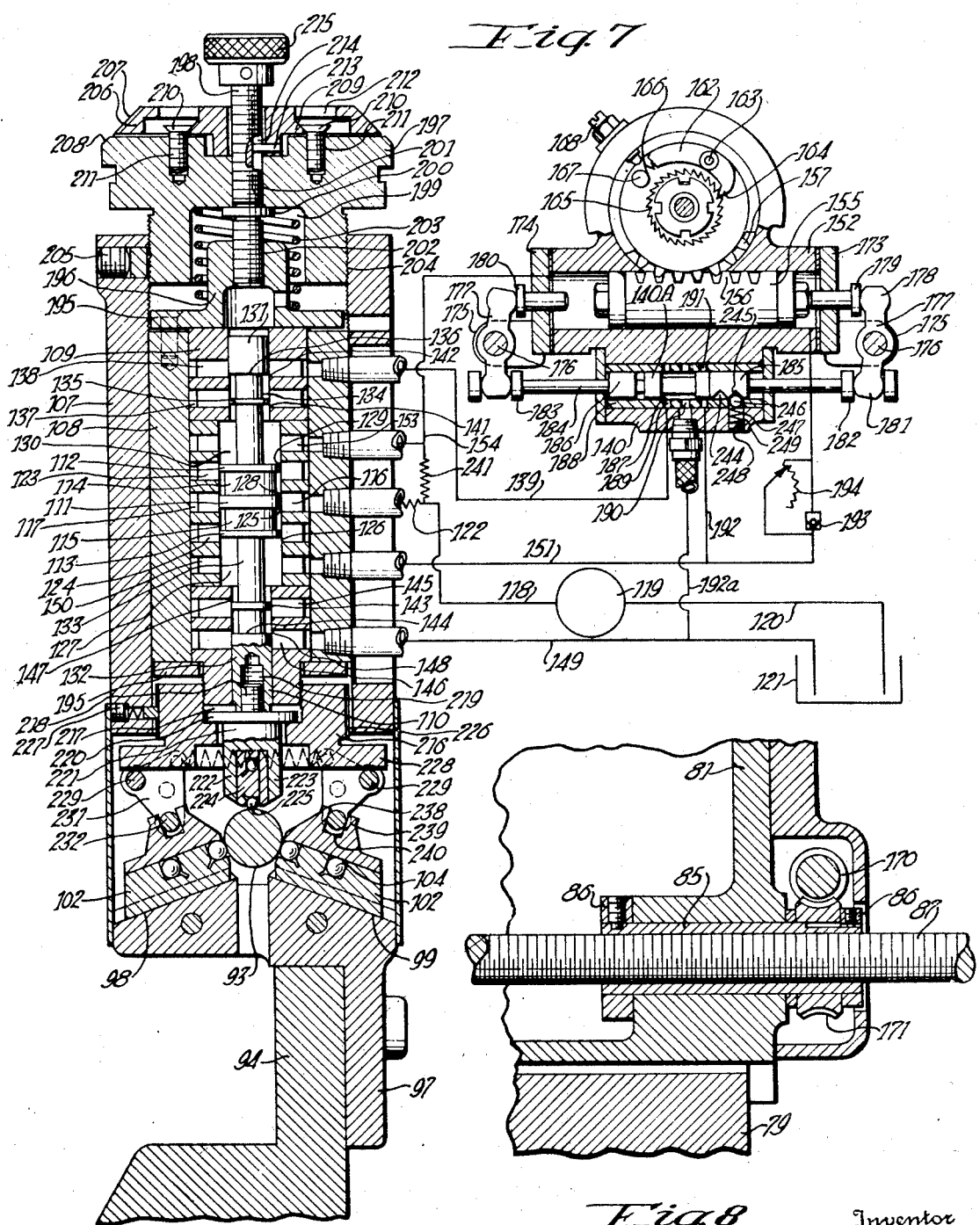
Figure 7 is a sectional view through the valve or control mechanism as seen from line 7—7 of Figure 5 having connected therewith the feeding mechanism operated by the valve.
Figure 8 is a fragmentary sectional view taken on line 8—8 of Figure 6.
Figure 15 is a fragmentary sectional view of a portion of Figure 7 showing in detail the load and fire mechanism associated with the reversing valve.

Secured to the rear surface of the work rest block 94 is a bracket 97 having its upper surface inclining in opposite directions from its vertical axis, as shown at 98 and 99 in Figures 7 and 9. The surfaces 98 and 99 are substantially duplicates of one another and it is deemed sufficient if but one of them be described in detail, wherefor the surface 98 has formed therein a dovetailed guideway 100 receiving a dove-tailed tongue 101 formed on the lower surface of a shoe 102. The shoe 102, see Figure 10, is formed with a milled channel 103 forming a race for a plurality of anti-friction bearing balls 104. The inner end of the channel 103 breaks through the inner wall of the shoe 102 so that the balls extend from opposite shoes into the way or channel formed between them. Secured to the upper surface of the shoe 102 is a cover plate 105 for confining the balls within the channel and whereby a path or race for the balls is completed. The end of the cover plate 105 is provided with a down turned lip 106 which prevents the inadvertent loss of the balls from the raceway or channel 103. The opposed rows of the balls 104 projecting from the shoes 102 form a support for the work pieces and are in alignment with the angle top 96 of the blade 95 receiving the said work as it is discharged from the grinding throat. Disposed above the shoes 102 is a sizing mechanism adapted to be engaged by oversize work pieces which actuates a mechanism to be later described for effecting an incremental feed of the regulating wheel toward the grinding wheel to thereby reduce subsequent work pieces to the desired or established size thereof. This sizing mechanism is hydraulically controlled and incorporates the valve illustrated in Figure 4, being slightly modified so as to make the valve more sensitive to minute variations in size. It has been found in practice that this valve or sizing mechanism will respond to variations in size as small as a tenth of a thousandth of an inch and fractions thereof. This sizing mechanism operates a feeding mechanism that is arranged so as not to respond more than once to the oversize of a given work piece, thereby preventing the formation of work pieces so far below the desired or actual size of the work piece as to render same incapable of use.

The sizing mechanism comprises a casing or cylindrical bracket 107 in which is enclosed a valve sleeve 108 through which is formed a plurality of ports. The sleeve 108 in turn encloses a bushing 109 in which is mounted a valve similar in principle to the valve 16 illustrated in Figure 1. The valve enclosed within the bushing 109 and indicated by the reference numeral 110 is formed with a central enlarged portion composed of collars 111, 112 and 113 between which are formed cannelures 114 and 115. The collar 111 co-operates with a plurality of ports 116 formed radially through the bushing 109 and which ports are connected by a groove 117 formed exteriorly of the bushing 109. The groove 117 is constantly in communication with the end of a conduit or channel 118 extending from the discharge side of a pump 119. The intake side of the pump 119 is connected by a conduit or channel 120 with a tank or sump 121 containing an hydraulic medium, preferably oil, utilized in the operation of this invention. The line or conduit 118 has therein a low resistance 122 so that there is a slight pressure drop between the groove 117 and line 118 to serve a purpose to be further amplified. The end collars 112 and 113 of the enlarged central portion of the valve respectively similarly co-operate with a plurality of radial ports 123 and 124, each of which plurality of ports are respectively connected by a groove similar to the groove 117 exteriorly of the bushing 109.

By this construction a plurality of resistances is set up to the flow of the hydraulic medium from the line 118 instead of but a single resistance as shown in Figures 1 and 4. In other words, the collar 111 co-operating with the radial ports 116 provides the resistance 125 and the collar 113 co-operating with the radial ports 115 provides the resistance 126 to the flow of the medium into the chamber 127 below the central enlarged portion of the valve, as seen in Figures 7 and 9. Likewise the collar 111 and radial ports 116 provide the resistance 128 and the collar 112 and radial ports 123 provide the resistance 129 to the flow of the medium from the line 118 into the chamber 130 formed on the upper side of the enlarged central portion of the valve, as seen in these figures. From this it will be seen that the resistance 42, for example, of the valve shown in Figure 1, is split up into the resistances 128 and 129, while the resistance 43 is split up into resistances 124 and 126. This multiplication of resistances could go on indefinitely and each pair of resistances thus provided increases the sensitivity of the device since a corresponding variation in each resistance multiplies the rate of flow and consequently more rapidly varies the pressure in the chambers and a much less movement of the valve is necessary to make a much larger variation in the pressures.

The valve 110 is formed on opposite ends with piston guide portions 131 and 132 which are of a larger diameter than the valve stem portion 133 connecting the enlarged central portion and end guide portions. The upper piston guide portion 131 of the valve is provided with a circumferential groove 134, thereby providing a collar 135 and a shoulder 136. The collar 135 and shoulder 136 respectively co-operate with radial ports 137 and 138 formed through the valve bushing 109 and the radial ports of each group are respectively connected by an external groove similar to the groove 117 formed exteriorly of the bushing 109. The circumferential groove connecting the radial ports 138 is in constant communication with the end of a conduit or channel 139 which terminates in a valve casing 140 associated with the infeed mechanism. The casing 140 is in turn connected by suitable conduits or channels with the tank or sump 121, as will be explained in detail later. The collar 135 of the piston guide portion 131 while co-operating with the radial ports 137 provides a resistance 141 to the flow of the hydraulic medium on its way to the conduit 139. The shoulder 136 co-operates with the radial ports 138 to provide the resistance 142 which in addition to the resistance 141 further impedes the flow of the fluid to the conduit 139 to thereby control and establish a pressure within the chamber 130. The resistances 141 and 142 are similar to the resistance 44 of Figures 1 and 4 and serve the same purpose.

The lower piston guide portion 132 of the valve 110 similar to the piston guide portion 131 is provided with a circumferential groove to form a collar 143 and a shoulder 144. The collar 143 and shoulder 144 similar to those formed on the upper guide piston co-operate with radial ports 145 and 146 to form resistances 147 and 148 impeding the flow of the hydraulic medium from the chamber 127 into a conduit 149 extending from the ports 146. The conduit or channel 149 terminates in the tank or sump 121. The resistances 147 and 148 are a multiplication of the resistance 45 of Figures 1 and 4 and control and determine the pressure within the chamber 127.

In practice the resistances 129 and 128 are respectively equal to the resistances 147 and 148, while the resistances 125 and 126 are made equal to the resistances 141 and 142 so that the sums of the resistances on each side of the collar 111 are equal. From this it will also be noted that any movement of the valve 110 relative to the bushing 109 and ports therein correspondingly decreases the out resistances (141, 142, 147 and 148) as the in resistances (129, 128, 125 and 126) are increased and vice versa. As was noted above, by dividing or multiplying these resistances the sensitivity of the valve is materially increased because each resistance bears a definite relation either to the flow of the medium into the chambers 127 and 130 or to the flow outwardly therefrom and thereby varies and controls the pressures in these channels. By this construction a relatively small movement of the valve such as a tenth of a thousandth of an inch or less will make a relatively large differential in the pressures in the two chambers.

The chamber 127 is in constant communication with a plurality of radial ports 150 connected by a groove similar to the groove 117 and formed exteriorly of the bushing 109. Communicating with this groove of the radial ports 150 is a conduit or channel 151 having its other end terminating in a piston or motor casing or cylinder 152. The chamber 130 is also in constant communication with a plurality of radial grooves 153 connected together by a groove similar to the groove 117 and formed exteriorly of the bushing 109. Communicating with the groove of the radial ports 153 is the end of a conduit or channel 154, which has its other end connected to the other end of the motor casing or cylinder.

Figure 6:
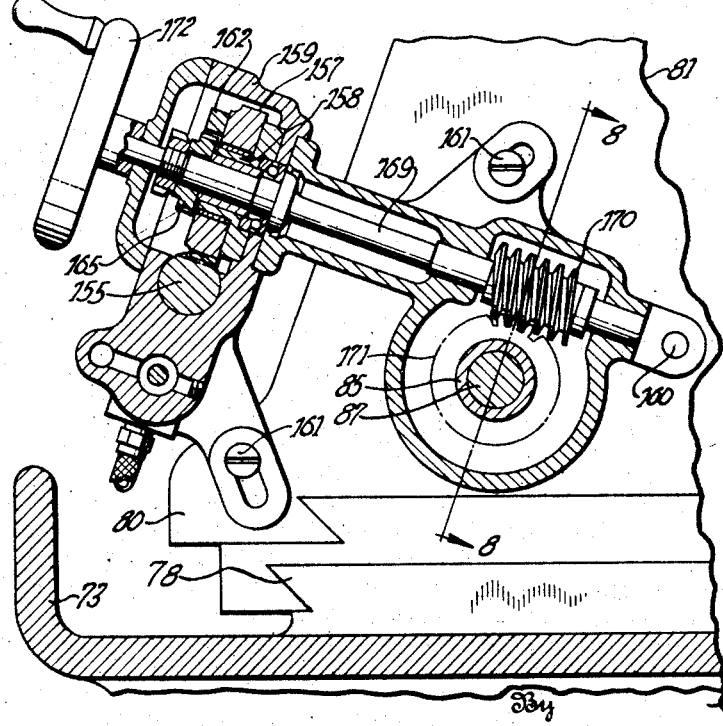
Figure 6 is a fragmentary sectional view taken on line 6—6 of Figure 5.

Enclosed within the motor casing or cylinder 152 is a piston 155 adapted to be reciprocated relative thereto and having formed integral therewith or secured to one side thereof rack teeth 156 which are in mesh with a segmental gear 157 loosely journaled on a sleeve 158, see Figure 6. The sleeve 158 is secured to a bracket 159 secured as by the pivot 160 and screw clamps 161 to the end of the bracket or slide 81. A pawl 162, pivoted intermediate its ends at 163 to the segmental gear 157, has a nose 164 adapted to engage the ratchet teeth of a ratchet 165. A spring 166 abutting on opposite ends with the spring carrier 167 and the tail of the pawl 162 urges the nose 164 into engagement with the ratchet teeth. An adjustable lock out screw 168 is carried by the housing 159 for engagement with the cam surface formed on the tail of the pawl 162 for disengaging the pawl nose and ratchet teeth during a portion of the oscillatory movement of the gear 157. The ratchet 165 is keyed or otherwise secured to a shaft 169 rotatably journaled in the bracket 159. The shaft 169 has secured to it or formed integral therewith a worm 170 meshing with a worm wheel 171 keyed or otherwise secured to the sleeve nut 85, see Figure 8. The end of the shaft 169 extends beyond the bracket 159 and carries a hand wheel 172 whereby it may be manually actuated for minutely adjusting the sleeve nut and parts carried thereby relative to the screw 87.

The motor casing or cylinder 152 is closed at opposite ends by heads or caps 173 and 174. Secured to or formed integral with said heads or caps are lugs 175 to which are pivoted as at 176 levers 177. The upper ends of the levers are ball shaped as at 178 and respectively contact with plungers 179 and 180 slidably mounted in the heads 173 and 174. The lower ends of the levers 177 are also ball shaped as at 181 and are respectively disposed between pairs of collars 182 and 183 formed respectively at the right and left hand ends of a valve stem 184. The valve stem 184 extends through the end caps, carried by the valve casing 140, and has loosely mounted thereon interiorly of the casing the valve 140A having piston portions 185 and 186 between which is provided the cannelure 187. The valve 140A is confined between the valve stem heads 260 and 261 whereby lost motion is provided. A valve bushing 188 surrounds the valve and is disposed interiorly of the casing having ports 189, 190 and 191 which are adapted in different positions of the valve to be connected with one another. The valve stem 184 and valve carried thereby are partially shifted by movement of the sliding plungers 179 and 180 themselves actuated by the piston 155 near each end of its movement. In order to complete the shifting of the valve stem 184 and its valve there is provided a load and fire mechanism which consists of a pair of notches 244 and 245 formed in either of the valve stem heads, here shown as formed in the head 260. Co-operating with the said notches is a spring loaded dog 246 actuated by the spring 247 contacting on one end with the dog and on the other end with a plug 248 that closes the passage 249 through which the spring passes. These parts are so arranged, as shown in Figure 7, that the ports 189 and 191 are not yet opened when the load and fire mechanism completes the shifting of the valve.

As shown in Figure 7, the conduit or channel 139 terminates at the port 189 which is connected by the cannelure 187 with a discharge conduit or channel 192a that in turn connects with the conduit 149 terminating in the tank or sump 121. Extending from the port 191 is a conduit or channel 192 that terminates at its other end in the conduit or channel 151. As was noted above, the conduit or channel 151 extends to the right hand end of the motor casing 152 and this conduit has formed therein a one way check valve 193 which permits unrestricted flow of the fluid through the conduit 151 into the motor casing for shifting the piston 155 therein to the left at a rapid rate. This check valve, however, prevents reverse flow of the medium from the motor casing through the conduit 151 at a rapid rate and forces the medium to pass through an adjustable throttle valve 194 which may be of any well known or approved design. This adjustable throttle valve 194 is merely a by-pass around the check valve 193 and controls the speed at which the piston 155 is actuated from left to right to insure the displacement of the work piece which operated the sizing mechanism by a subsequent, unmeasured work piece that has been reduced beyond the point of the previous work piece.

Referring again to the sizing mechanism located in the throat of the machine, the sleeve 108, bushing 109, and valve 110 are adapted to be axially adjusted relative to the cylindrical casing or support 107 to adapt the mechanism to different sizes of work pieces. For this reason the sleeve 108 has secured to its upper and lower ends a cap 195, the upper cap having a boss 196 projecting therefrom. The said caps confine the bushing between them so that any movement imparted to the sleeve carries the bushing with it. Threaded into the upper end of the cylindrical housing 107 is a carrier 197 through which is threaded an adjusting screw 198. The carrier 197 is provided with a recessed portion 199 which telescopes with the boss 196 of the sleeve cap 195. The adjusting screw 198 has a collar 200 formed intermediate its length which engages the base of the recess 199 to limit outward movement of the screw and the collar 200 divides the screw into two threaded portions 201 and 202. The threaded portion 201 passes through the carrier 197, while the threaded portion 202 extends through the boss 196. A spring 203 surrounds the boss 196 and abuts on opposite ends with the base of the recess 199 and the cap 195 tending to shift the members away from one another and thereby taking up any back lash or play between the threads of the threaded portions of the adjusting screw and the parts carrying it. The threaded portions 201 and 202 are of the same hand but of a slightly different pitch such, for example, as 20 and 19 threads to the inch respectively. The carrier 197, as above noted, is threaded at 204 into the upper end of the cylindrical casing 107 by means of threads which are of the opposite hand from those on the screw 198 and, carrying forward the example above started, are of a pitch of 20 threads to the inch. The carrier 197 is normally locked in position by means of a clamping screw 205. Surrounding the threaded portion 201 of the adjusting screw 198 is a dial 206 having an inclined edge 207 on which may be scribed suitable indicia to co-operate with a zero point or marker carried by the bevelled edge 208 of the carrier 197. Interiorly of the dial 206 it is provided with a bevelled flange 209 adapted to underlie the bevel heads 210 of guide and clamp screws 211 supported by the carrier 197. Access may be had to the screws 211 through suitable openings 212 formed through the dial 206 for screwing down the said screws and thereby clamping the dial in position. In order that the dial may be moved with the screw, it has projecting from it a pin or key 213 received in a keyway 214 formed longitudinally of the threaded portion 201 of the adjusting screw.

The operation of the parts for adjusting the position of the valve relative to the housing 107 is as follows: The clamp screws 211 are loosened and the knob 215 grasped and rotated in one or the other direction for thereby axially shifting the screw portion 201 relative to the carrier 197. Simultaneously with this movement the threaded portion 202 axially shifts the cap 195 relative to it. Since the threaded portion 201 is of 20 pitch and, for example, in the left hand direction and the threaded portion 202 is 19 pitch and of the same hand, the valve and parts carried thereby will only move the difference between 1/20th of an inch and 1/19th of an inch in either an upward or downward direction for each revolution of the screw. From this it will be seen that the valve may be minutely adjusted fractional thousandths of an inch since a complete revolution of the screw will merely adjust the parts a little over two thousandths of an inch. When it is desired to rapidly adjust the parts to make large adjustments of the valve, the clamp screws 211 are screwed home to lock the dial 206 to the carrier 197. The knob 215 is then grasped in one hand to hold same against movement and the carrier 197 rotated with the other hand. By this adjustment the carrier 197 is axially shifted relative to the threaded portion 201 simultaneously with the shifting of the carrier relative to the cylindrical housing 107. The axial shifting of the adjusting screw carries with it the valve and parts associated therewith simultaneously with the shifting of these parts through movement of the carrier 197. Since the screw threads are of the same pitch and of the same hand the parts will be moved the sum of the leads of these screws or 1/20th of an inch plus 1/20th of an inch, or 1/10th of an inch. If it is then desired to adjust the parts minutely or to a thousandth part of an inch, the adjustment through the screw 198, above described, is resorted to.

The lower end of the valve bushing 109 is exteriorly threaded to receive a nut 216 which is formed interiorly thereof and below the bushing with a recess 217. A sizing finger is secured to the lower end of the valve 110 and comprises a threaded stud 218 received in a bore 219 formed in the lower end of the valve. The sizing finger in addition to the stud 218 includes an enlarged head 220 which is received in the recess 217 of the nut 216. A stem 221 extends from the head or collar 220 and forms arms 222 and 223 between which is rotatably mounted an anti-friction contact member 224 forming a race for the anti-friction bearing balls 225 which actually contact with the work to determine its actual size. The nut 216 is adjusted relative to the bushing 109 to vary the recess 217 and thereby determine the amount of movement to be given to the valve before it is unbalanced or to determine the amount of ultimate movement of the valve and the difference in pressures in the operating lines 151 and 154. To hold the nut 216 in its adjusted position, it is provided around its periphery with serrations or teeth 226 adapted to receive the spring pressed pawl 227.

The nut 216 is provided at its lower end with a flange 228 against which on opposite sides of the center thereof abut shafts 229. As shown in Figure 14, the shafts 229 extend beyond the lateral dimension of the flange 228 and have secured to them at opposite ends levers or arms 230 and 231. Near the lower ends of the arms they are connected by means of a shaft 232 again of a length greater than the lateral diameter of the nut flange 228. The cylindrical housing 107 has near the base thereof lugs 233 and 234 through which project centers 235 and 236 having their centering points received in suitable center bores formed in the outer surfaces of the arms or levers 230 and 231. From the foregoing it will be noted that downward movement of the nut carrying the collar or flange 228 will effect oscillation of the arms 230 and 231, and parts carried thereby, through the shaft 229 in a clockwise direction, as seen for example in Figures 7 and 9. The levers 230 and 231 on opposite sides of the center of the sizing mechanism are connected by means of a spring 237 so as to at all times maintain contact between the nut flange 228 and shaft 229. From this it will be seen that the upward movement of the said flange 228 will through the spring 237 oscillate the levers in a counterclockwise direction.

This construction and movement of the parts is for the purpose of simultaneously adjusting the shoes 102 along the guideways 98 and 99. For this purpose the plates 105 are each provided with upstanding legs 238 and 239 forming between them a recess 240 in which the shaft or bar 232 which connects the arms 230 and 231 is received. From this it will be seen that movement of the levers 230 and 231 with the movement of the valve and parts associated therewith simultaneously shifts the supporting balls 104 of each of the shoes toward or from one another in accordance with the movement of the contact ball 225 toward or from the said supporting balls. In other words, by this mechanism the three point contact between the supporting balls and contact ball is at all times maintained, completing between them a perfect circle.

The operation of the sizing mechanism is as follows: The parts are normally in the position shown in Figure 7. In this position the valve 110 is slightly unbalanced so that the greater pressure is in chamber 130 acting on the piston 111 for holding the valve 110 downwardly with the collar 220 of the contact finger or head engaging the shoulder formed by the recess 217 in the nut 216. With the parts in this position there is a difference of pressure in the chambers 130 and 127 which may be of any desired value depending upon the adjustment of the member 216. The parts are shown by way of example only as being adapted to be unbalanced by a work piece a tenth of a thousandth of an inch above the desired size. Accordingly, the three point throat formed by the supporting balls 104 and the contact ball 225, with the parts in the position shown in Figure 7, is of the exact size to receive the work piece from the supporting blade 95 of the machine.

With a greater pressure in the chamber 130 there is consequently a greater pressure in the conduit 154 acting on the left hand end of the piston 155 and shifting said piston to the right and holding same in this position. The movement of the piston 155 to the right shifted the valve on valve stem 184 to the left connecting the exhaust conduit or channel 139 through ports 189 and 190 with the tank or sump 121 by way of the conduit 192a. At this time the exhaust conduit 149 is connected direct to the tank or sump 121. As soon as an oversize work piece comes into contact with the contact ball 225, the valve is raised to a point where the pressures in the chambers 130 and 127 are reversed, namely the higher pressure being in chamber 127 and the lower pressure being in the chamber 130. As soon as this occurs, the valve 110 is immediately shifted or elevated, thereby as above described, immediately making a greater difference in pressure in the two chambers 127 and 130. This greater pressure in the chamber 127 flows through the conduit 151 and check valve 193 therein into the cylinder 152 for shifting the piston 155 therein at a rapid rate to the left hand end of the cylinder, which through the rack teeth 156 oscillates the segmental gear 157 in a clockwise direction.

This movement of the segmental gear 157 carrying the pawl 162 correspondingly actuates the ratchet 155 which is keyed to the shaft 169 and consequently rotating it together with the worm 170 on the shaft and through the worm wheel 171 advances the nut 185 and parts associated therewith to reduce the grinding throat an amount to bring the next work piece to the desired size.

The movement of the piston 155 in the cylinder 152 at the end of said piston movement shifts the valve on the stem 184 for cutting off from reservoir the conduit or channel 139 and connecting with reservoir the conduit or channel 151 through the conduit 192, ports 191 and 190 and conduit 192a. The pressure in the chamber 127 and conduit 151 now drops quite low or to a point substantially equal to the pressure in the chamber 130 and conduit 154 prior to the shifting of the valve 110. The shifting of the valve 110 has raised the value of the resistances 129 and 128 to infinity, or has closed the orifices forming said resistances, thereby preventing any flow of the hydraulic medium therethrough into the chamber 130. It is at this time that the low resistance 122 comes into operation and prevents an unrestricted flow of the medium from the pump through the chamber 127 and conduit 151 back to the sump or tank, as would be the case were no interference offered. This resistance then causes a pressure drop between the pump line 118 and the chamber 127 and this pressure difference is utilized to force the fluid through the high resistance 241 into the chamber 130. The medium flowing through said high resistance 241 and conduit 154, connected therewith, into the chamber 130 will attempt to escape by way of conduit 139 to the sump. This conduit, however, is now blocked by the valve on the valve stem 184 thereby preventing escape of the medium from the chamber 130 but causing same to be trapped therein. This discharge from pump line 118 through the high resistance 241 into the conduit 154 and chamber 130 gradually builds up a pressure in the chamber 130 above that in chamber 127 and acts on the piston 111 for returning the valve to its initial position, that shown in Figure 7, and thereby again establishing a pressure difference in the chambers 127 and 130. This pressure difference is carried by the conduit 154 into the left hand end of the cylinder 152 for shifting the piston 155 therein to the right.

This operation of the parts takes place in a relatively short period of time and to prevent the relative feed between work and wheel more than once for each oversize work piece the operation of these parts must be controlled, which can conveniently take the form of a control for the return or shifting of the piston 155 to the right. Accordingly, the exhaust from the other end of the piston 155 is forced out through the adjustable throttle 194, which throttle is so adjusted as to time the resetting of the valve with the feeding of the work pieces from the grinding throat so that each work piece is sized but once in the event it is of an oversize or beyond the desired or accepted size.

The natural amplification of the work supporting mechanism which supports the work beneath the sizing valve is diagrammatically illustrated in Figure 12 of the drawings. As was above noted the supporting balls 104 and the contact ball 225 when properly positioned constitute three points of a perfect circle representative of the desired size of the work. In the past in order to insure the proper functioning of a sizing mechanism amplification levers were employed so that a minute change in size would be sufficiently amplified to operate the infeed mechanism. In these structures lost motion, deflection or twist and the like rendered the device not as sensitive as was desired. By supporting the work on the balls 104 which are so arranged as to have a large included angle with the center of the work, any variation in the normal or desired size of the work is greatly amplified, throwing the upper end or the point which engages with the contact balls 225 considerably above the point of a normal work piece. The circle 242, shown in Figure 12, represents the standard size work piece carried by the supporting balls 104 and the dotted line circle 243 an oversize work piece. The difference in the radii of these work pieces is indicated by the dimension $x$ and if the oversize work piece were supported by a flat surface the center thereof would be shifted upwardly over the center of the normal work a distance corresponding to the distance $x$, while the point diametrically opposed to the supporting point would be positioned twice the distance $x$ above the normal work piece, or a distance equal to the differences in diameters of the work pieces. This difference in the diameters might or might not be sufficient to operate a sizing mechanism as it will be in the nature of a small fraction of an inch, such as two ten-thousandths of an inch. By supporting the oversize work piece on the supporting balls 104 the center is raised a considerably greater distance than the distance $x$, which is indicated on the drawings by the letter $y$. This correspondingly shifts the upper point of the work plus the difference in diameters betwen the work pieces or a distance represented by the reference character $z$. From this it will be seen that the work support including the widely spaced balls 104 greatly amplifies any change in size in the work without resort to any extraneous parts whatsoever, the amplification being a natural function of the parts as arranged and assembled. By this mechanism a variation in oversize of the work piece by so much as a tenth of a thousandth of an inch or a fraction thereof will be more than sufficient to shift the valve through the distance necessary to unbalance the pressures in the chambers 127 and 130 and thereby effect an operation of the feeding mechanism to compensate for the oversize of the work.

What is claimed is:

1. In an hydraulic system the combination with an hydraulic medium circulator for circulating an hydraulic medium through the system, of a sump for said medium, a conduit for the medium between the circulator and the sump, a branch conduit extending from the main conduit, and valve means in the main conduit for varying the pressure of the medium and discharging said medium of varied pressure into the branch conduit.

2. In an hydraulic control system the combination with an hydraulic medium circulator for circulating an hydraulic medium under pressure, and a conduit for said medium extending from the circulator to a sump, of variable resistances in said conduit for effecting a pressure drop therein, and branch conveying means for carrying said medium at the lower pressure from the conduit.

3. In an hydraulic control system the combination with an hydraulic medium circulator for circulating an hydraulic medium under pressure, and a conduit for said medium extending from the circulator to a sump, of variable resistances in said conduit for effecting a pressure drop therein, branch conveying means for carrying said medium at the lower pressure from the conduit, and means for varying the value of said resistances to thereby vary the pressure drop and the pressure in the branch conveying means.

4. In an hydraulic control system the combination with pressure creating means, of an hydraulic medium adapted to be circulated under pressure by the pressure creating means, a sump for the medium, a conduit for the medium between the pressure creating means and sump, a pair of resistances in said conduit for determining the rate of flow of the medium through the conduit and effecting a pressure drop between the pressure creating means and a point between said resistances, and a branch conduit for conveying the medium at a pressure in accordance with the pressure drop as effected by the resistances.

5. In an hydraulic control system the combination with pressure creating means, of an hydraulic medium adapted to be circulated under pressure by the pressure creating means, a sump for the medium, a conduit for the medium between the pressure creating means and sump, a pair of resistances in said conduit for determining the rate of flow of the medium through the conduit and effecting a pressure drop between the pressure creating means and a point between said resistances, a branch conduit for conveying the medium at a pressure in accordance with the pressure drop as effected by the resistances, and means for adjusting the value of the resistances to thereby change the pressure in the branch conduit.

6. In an hydraulic control system the combination with an hydraulic medium circulator for circulating an hydraulic medium under pressure, and a conduit for the medium, of branch conduits extending from the main conduit between which the flow of the medium is divided, said branch conduits terminating in a sump for the medium, means in each branch conduit for effecting a pressure drop therein as compared to the pressure in the main conduit, and conveying means extending from each branch conduit for conveying the medium at a pressure equal to the pressure in its branch conduit.

7. In an hydraulic control system the combination with an hydraulic medium circulator for circulating an hydraulic medium under pressure, and a conduit for the medium, of branch conduits extending from the main conduit between which the flow of the medium is divided, said branch conduits terminating in a sump for the medium, means in each branch conduit for effecting a pressure drop therein as compared to the pressure in the main conduit, and conveying means extending from each branch conduit for conveying the medium at a pressure equal to the pressure in its branch conduit, said pressure drop means being adjustable to vary the pressure drop in said branch conduits and consequently vary the pressure in the conveying means.

8. In an hydraulic control system the combination with an hydraulic medium circulator for circulating an hydraulic medium under pressure, and a conduit for the medium, of branch conduits extending from the main conduit between which the flow of the medium is divided, said branch conduits terminating in a sump for the medium, means in each branch conduit for effecting a pressure drop therein as compared to the pressure in the main conduit, conveying means extending from each branch conduit for conveying the medium at a pressure equal to the pressure in its branch conduit, and means for varying the pressure drop means in each branch conduit simultaneously and inversely whereby the pressure drop in said branch conduits and conveying means is inversely varied.

9. In an hydraulic control system the combination with an hydraulic medium circulator for circulating an hydraulic medium under pressure, and a conduit therefor, of a valve casing having an inlet port with which the terminus of the conduit connects, a slidable spool type valve within the casing having a pair of piston portions thereon forming a chamber between them, and an exhaust port from the casing at the end of the chamber, the piston portions of the valve co-operating with the inlet and exhaust ports to form resistances to the flow of the hydraulic medium through the chamber and effect a pressure drop in said chamber.

10. In an hydraulic control system the combination with an hydraulic medium circulator for circulating an hydraulic medium under pressure, and a conduit therefor, of a valve casing having an inlet port with which the terminus of the conduit connects, a slidable spool type valve within the casing having a pair of piston portions thereon forming a chamber between them, an exhaust port from the casing at the end of the chamber, the piston portions of the valve co-operating with the inlet and exhaust ports to form resistances to the flow of the hydraulic medium through the chamber and effect a pressure drop in said chamber, and conveying means from the chamber for conveying the medium at the lowered pressure.

11. In an hydraulic control system the combination with an hydraulic medium circulator for circulating an hydraulic medium under pressure, and a conduit therefor, of a valve casing having an inlet port with which the terminus of the conduit connects, a slidable spool type valve within the casing having a pair of piston portions thereon forming a chamber between them, an exhaust port from the casing at the end of the chamber, the piston portions of the valve co-operating with the inlet and exhaust ports to form resistances to the flow of the hydraulic medium through the chamber and effect a pressure drop in said chamber, conveying means from the chamber for conveying the medium at the lowered pressure, and means for shifting the valve for simultaneously varying the resistances formed at the inlet and exhaust ports for changing the pressure drop in the chamber and conveying means.

12. In an hydraulic control system the combination with an hydraulic medium circulator for circulating an hydraulic medium under pressure, and a conduit for the medium, of a valve mechanism at the terminus of the conduit for effecting a division of the pressure between two legs of flow including a valve casing, the valve casing having an inlet port therein through which the medium enters the casing, a slidable valve within the casing and having formed thereon a piston portion of a width less than the major dimension of the inlet port for setting up a resistance to and effecting a division of the flow to opposite sides of said piston portion of the valve, an exhaust port through the casing for each leg of the flow, and additional piston portions on the valve co-operating with the exhaust ports for setting up resistances to the flow from each leg through the exhaust ports, whereby the inlet and exhaust resistances determine the pressure in each leg of flow of the medium.

13. In an hydraulic control system the combination with an hydraulic medium circulator for circulating an hydraulic medium under pressure, and a conduit for the medium, of a valve mechanism at the terminus of the conduit for effecting a division of the pressure between two legs of flow including a valve casing, the valve casing having an inlet port therein through which the medium enters the casing, a slidable valve within the casing and having formed thereon a piston portion of a width less than the major dimension of the inlet port for setting up a resistance to and effecting a division of the flow to opposite sides of said piston portion of the valve, an exhaust port through the casing for each leg of the flow, additional piston portions on the valve co-operating with the exhaust ports for setting up resistances to the flow from each leg through the exhaust ports, whereby the inlet and exhaust resistances determine the pressure in each leg of flow of the medium, and branch conduits for conveying the medium from each leg at the pressure established by the said resistances.

14. In an hydraulic control system the combination with an hydraulic medium circulator for circulating an hydraulic medium under pressure, and a conduit for the medium, of a valve mechanism at the terminus of the conduit for effecting a division of the pressure between two legs of flow including a valve casing, the valve casing having an inlet port therein through which the medium enters the casing, a slidable valve within the casing and having formed thereon a piston portion of a width less than the major dimension of the inlet port for setting up a resistance to and effecting a division of the flow to opposite sides of said piston portion of the valve, an exhaust port through the casing for each leg of the flow, additional piston portions on the valve co-operating with the exhaust ports for setting up resistances to the flow from each leg through the exhaust ports, whereby the inlet and exhaust resistances determine the pressure in each leg of flow of the medium, means for shifting the valve relative to its casing for changing the value of the inlet and exhaust resistances for thereby changing the pressures in each leg of flow, and branch conduits for conveying the medium from each leg at the pressure established by the resistances.

15. In an hydraulic control system the combination with an hydraulic medium circulator for circulating an hydraulic medium under pressure, and a conduit for the medium, of a valve mechanism at the terminus of the conduit for effecting a division of the pressure between two legs of flow including a valve casing, the valve casing having an inlet port therein through which the medium enters the casing, a slidable valve within the casing and having formed thereon a piston portion of a width less than the major dimension of the inlet port for setting up a resistance to and effecting a division of the flow to opposite sides of said piston portion of the valve, an exhaust port through the casing for each leg of the flow, additional piston portions on the valve co-operating with the exhaust ports for setting up resistances to the flow from each leg through the exhaust ports, whereby the inlet and exhaust resistances determine the pressure in each leg of flow of the medium, means for shifting the valve relative to its casing for changing the value of the inlet and exhaust resistances for thereby changing the pressures in each leg of flow, branch conduits for conveying the medium from each leg at the pressure established by the resistances, and means associated with the valve and connected with the branch conduits for effecting its shifting in accordance with the difference in pressures in said branch conduits.

16. In an hydraulic control system for machine tools the combination with a grinding wheel, of work supporting mechanism adjacent the grinding wheel for supporting a work piece while being operated upon by the said grinding wheel, a feeding mechanism for effecting an incremental feed between the work support and the grinding wheel to maintain the size of the work being produced, an hydraulically actuated piston for operating the feeding mechanism, and a valve adapted to be engaged by the work and movable by an oversize work piece for controlling the flow of the hydraulic medium to the piston.

17. In an hydraulic control system for a sizing device for use with machine tool structures for effecting a relative feed between the work and tool to maintain the size of the work as produced thereby, the combination of an hydraulically operated feeding mechanism including a reciprocating piston operable by a difference in pressures at the ends thereof, and a valve for normally maintaining a higher pressure on one end of the piston but which valve is directly shiftable by an oversize work piece for reversing the pressures on the ends of the piston and effecting its operation.

18. In an hydraulic control system for a sizing mechanism for use with machine tools the combination of means for effecting a relative feed between a work piece and a tool, an hydraulic motor operable by a difference in pressures at the ends thereof for actuating the feeding mechanism, a valve for effecting and controlling the pressures at the ends of the motor and normally held in a given position by said difference in pressures, the valve being adapted to be directly engaged by an oversize work piece for effecting a shifting thereof, and means associated with said valve for changing the pressures at the ends of the motor when the valve is engaged by an oversize work piece.

19. In a work support for sizing mechanisms the combination of a shiftable sizing finger, and a pair of supporting points spaced from one another a distance to form with a sizing finger and throat to pass standard work piece, the sizing finger and supporting points being equally spaced from the axis of a standard size work piece when supported on the supporting points and whereby an oversize work piece when on the supporting points shifts the sizing finger a distance considerably greater than the difference in size between itself and a standard size work piece.

20. An hydraulic control system for use with sizing mechanisms of a machine tool organization the combination with a work support for supporting the work piece, a tool for operation on the work piece, and means for effecting a relative feed between the work and tool, of a valve for engagement with the work piece when oversize and effecting the operation of the feeding mechanism.

21. In a mechanism of the class described the combination with a work support, a tool for operation on the work while on said support, and means for effecting a relative feed between the tool and work, of supplemental means for receiving the work from the work support, hydraulic control means including a work contacting member associated with the supplemental supporting means adapted to engage the work when oversize, and means connecting the hydraulic control means and feeding means with one another whereby the latter is actuated by the former through the work.

22. In a mechanism of the class described the combination with a work support, a tool for operation on the work while on said support, and means for effecting a relative feed between the tool and work, of supplemental means for receiving the work from the work support, hydraulic control means including a work contacting member associated with the supplemental supporting means adapted to engage the work when oversize, and means connecting the hydraulic control means and feeding means with one another whereby the latter is actuated by the former through the work, said hydraulic control means including a valve, means associated with said valve for varying the pressure in the connecting means with the feeding mechanism whereby the feeding mechanism is operable by the variation in pressure effected by the work piece.

23. In a mechanism of the class described the combination with a work support, a tool for operation on the work while on the support, and a feeding mechanism for effecting a relative feed between the work and tool, of a supplemental work support for receiving work from the first mentioned work support, a sizing mechanism including a shiftable valve associated with the supplemental work support, an hydraulically actuated motor associated with the feeding mechanism and operably connected with the valve, an hydraulic circuit including an hydraulic medium under pressure for the valve and motor, said valve varying the pressure in the circuit and effecting a differential in pressure at each side of the motor whereby said motor is operable, and means associated with said valve engageable with the work for effecting said differential in pressure and thereby the operation of the motor.

24. In a mechanism of the class described the combination with a work support, a tool for operation on the work while on the support, and a feeding mechanism for effecting a relative feed between the work and tool, of a supplemental work support for receiving work from the first mentioned work support, a sizing mechanism including a shiftable valve associated with the supplemental work support, an hydraulically actuated motor associated with the feeding mechanism and operably connected with the valve, an hydraulic circuit including an hydraulic medium under pressure for the valve and motor, said valve varying the pressure in the circuit and effecting a differential in pressure at each side of the motor whereby said motor is operable, means associated with said valve engageable with the work for effecting said differential in pressure and thereby the operation of the motor, and means for effecting a coarse adjustment of the valve toward and from the supplemental work support.

25. In a mechanism of the class described the combination with a work support, a tool for operation on the work while on the suport, and a feeding mechanism for effecting a relative feed between the work and tool, of a supplemental work support for receiving work from the first mentioned work support, a sizing mechanism including a shiftable valve associated with the supplemental work support, an hydraulically actuated motor associated with the feeding mechanism and operably connected with the valve, an hydraulic circuit including an hydraulic medium under pressure for the valve and motor, said valve varying the pressure in the circuit and effecting a differential in pressure at each side of the motor whereby said motor is operable, means associated with said valve engageable with the work for effecting said differential in pressure and thereby the operation of the motor, means for effecting a coarse adjustment of the valve toward and from the supplemental work support, and additional means for effecting a fine adjustment of the valve toward and from the supplemental work support.

26. In a mechanism of the class described the combination with a work support, a tool for operation on the work while on the support, and a feeding mechanism for effecting a relative feed between the work and tool, of a supplemental work support for receiving work from the first mentioned work support, a sizing mechanism including a shiftable valve associated with the supplemental work support, an hydraulically actuated motor associated with the feeding mechanism and operably connected with the valve, an hydraulic circuit including an hydraulic medium under pressure for the valve and motor, said valve varying the pressure in the circuit and effecting a differential in pressure at each side of the motor whereby said motor is operable, means associated with said valve engageable with the work for effecting said differential in pressure and thereby the operation of the motor, means for effecting a coarse adjustment of the valve toward and from the supplemental work support, additional means for effecting a fine adjustment of the valve toward and from the supplemental work support including a carrier, an adjusting screw having a plurality of threaded portions, each of a different pitch and of opposite hand, one of which is threaded into the carrier, and means associated with the valve into which the second portion is threaded, whereby rotation of the screw will adjust the valve a distance representative of the difference in pitch of the screw.

27. In a mechanism of the class described the combination with a work support, a tool for operation on the work while on the support, and a feeding mechanism for effecting a relative feed between the work and tool, of a supplemental work support for receiving work from the first mentioned work support, a sizing mechanism including a shiftable valve associated with the supplemental work support, an hydraulically actuated motor associated with the feeding mechanism and operably connected with the valve, an hydraulic circuit including an hydraulic medium under pressure for the valve and motor, said valve varying the pressure in the circuit and effecting a differential in pressure at each side of the motor whereby said motor is operable, means associated with said valve engageable with the work for effecting said differential in pressure and thereby the operation of the motor, means for effecting a coarse adjustment of the valve toward and from the supplemental work support, additional means for effecting a fine adjustment of the valve toward and from the supplemental work support including a carrier, an adjusting screw having a plurality of threaded portions, each of a different pitch and of opposite hand, one of which is threaded into the carrier, means associated with the valve into which the second portion is threaded, whereby rotation of the screw will adjust the valve a distance representative of the difference in pitch of the screw, and yielding means tending to shift the valve and carrier in opposite directions thereby to eliminate back lash in the threads.

28. In a mechanism of the class described the combination with a work support, a tool for operation on the work while on the support, and a feeding mechanism for effecting a relative feed between the work and tool, of a supplemental work support for receiving work from the first mentioned work support, a sizing mechanism including a shiftable valve associated with the supplemental work support, an hydraulically actuated motor associated with the feeding mechanism and operably connected with the valve, an hydraulic circuit including an hydraulic medium under pressure for the valve and motor, said valve varying the pressure in the circuit and effecting a differential in pressure at each side of the motor whereby said motor is operable, means associated with said valve engageable with the work for effecting said differential in pressure and thereby the operation of the motor, the supplemental work support including a pair of adjustable shoes and work contacting points carried by each shoe, and means for adjusting the valve toward and from the work supporting shoes.

29. In a mechanism of the class described the combination with a work support, a tool for operation on the work while on the support, and a feeding mechanism for effecting a relative feed between the work and tool, of a supplemental work support for receiving work from the first mentioned work support, a sizing mechanism including a shiftable valve associated with the supplemental work support, an hydraulically actuated motor associated with the feeding mechanism and operably connected with the valve, an hydraulic circuit including an hydraulic medium under pressure for the valve and motor, said valve varying the pressure in the circuit and effecting a differential in pressure at each side of the motor whereby said motor is operable, means associated with said valve engageable with the work for effecting said differential in pressure and thereby the operation of the motor, the supplemental work support including a pair of adjustable shoes and work contacting points carried by each shoe, means for adjusting the valve toward and from the work supporting shoes, and means for adjusting the shoes to effect a relative approach and retraction of the supporting points thereof.

30. In a mechanism of the class described the combination with a work support, a tool for operation on the work while on the support, and a feeding mechanism for effecting a relative feed between the work and tool, of a supplemental work support for receiving work from the first mentioned work support, a sizing mechanism including a shiftable valve associated with the supplemental work support, an hydraulically actuated motor associated with the feeding mechanism and operably connected with the valve, an hydraulic circuit including an hydraulic medium under pressure for the valve and motor, said valve varying the pressure in the circuit and effecting a differential in pressure at each side of the motor whereby said motor is operable, means associated with said valve engageable with the work for effecting said differential in pressure and thereby the operation of the motor, the supplemental work support including a pair of adjustable shoes and work contacting points carried by each shoe, means for adjusting the valve toward and from the work supporting shoes, means for adjusting the shoes to effect a relative approach and retraction of the supporting points thereof, and means for simultaneously effecting the operation of the shoes adjusting means in one direction with the valve when said valve is actuated in said one direction.

31. In a mechanism of the class described the combination with a work support, a tool for operation on the work while on the support, and a feeding mechanism for effecting a relative feed between the work and tool, of a supplemental work support for receiving work from the first mentioned work support, a sizing mechanism including a shiftable valve associated with the supplemental work support, an hydraulically actuated motor associated with the feeding mechanism and operably connected with the valve, an hydraulic circuit including an hydraulic medium under pressure for the valve and motor, said valve varying the pressure in the circuit and effecting a differential in pressure at each side of the motor whereby said motor is operable, means associated with said valve engageable with the work for effecting said differential in pressure and thereby the operation of the motor, the supplemental work support including a pair of adjustable shoes and work contacting points carried by each shoe, means for adjusting the valve toward and from the work supporting shoes, means for adjusting the shoes to effect a relative approach and retraction of the supporting points thereof, means for simultaneously effecting the operation of the shoes adjusting means in one direction with the valve when said valve is actuated in said one direction, and additional means for effecting the operation of the shoes adjusting means in the other direction when the valve is actuated in the said other direction.

ALBERT H. DALL.
HANS ERNST.